(12) United States Patent
Majumdar et al.

(10) Patent No.: US 10,399,391 B2
(45) Date of Patent: Sep. 3, 2019

(54) PNEUMATIC TIRE HAVING MULTIPLE BUILT-IN SEALANT LAYERS AND PREPARATION THEREOF

(71) Applicant: Triangle Tyre Co., Ltd, Weihai (CN)

(72) Inventors: Ramendra Nath Majumdar, Hudson, OH (US); Edward L. Montgomery, North Canton, OH (US); Changliang Fan, Weihai (CN); Lingbo Dong, Weihai (CN); Dapeng Wang, Weihai (CN)

(73) Assignee: Triangle Tyre Co., Ltd., Weihai (CN)

( * ) Notice: Subject to any disclaimer, the term of this patent is extended or adjusted under 35 U.S.C. 154(b) by 914 days.

(21) Appl. No.: 14/572,138

(22) Filed: Dec. 16, 2014

(65) Prior Publication Data
US 2016/0167455 A1    Jun. 16, 2016

(51) Int. Cl.
*B60C 19/12* (2006.01)
*B29D 30/06* (2006.01)
*B29C 73/16* (2006.01)
*B60C 5/14* (2006.01)
*B29C 73/22* (2006.01)
*B29C 73/20* (2006.01)

(52) U.S. Cl.
CPC .......... *B60C 19/122* (2013.01); *B29C 73/163* (2013.01); *B29C 73/22* (2013.01); *B29D 30/0685* (2013.01); *B60C 5/14* (2013.01); *B29C 73/20* (2013.01); *B29D 2030/0686* (2013.01)

(58) Field of Classification Search
CPC .............................. B60C 19/12; B60C 19/122
USPC ......................................................... 152/505
See application file for complete search history.

(56) References Cited

U.S. PATENT DOCUMENTS

| 4,895,610 | A | 1/1990 | Egan |
| 4,928,741 | A | 5/1990 | Rye et al. |
| 6,136,123 | A | 10/2000 | Kaido et al. |
| 6,390,164 | B1 * | 5/2002 | Beers ............ B60C 1/0008 152/510 |
| 6,786,990 | B1 | 9/2004 | Yamagiwa |

(Continued)

FOREIGN PATENT DOCUMENTS

| DE | 102008003554 A1 * | 7/2009 | ............. B29C 73/20 |
| EP | 0102844 A2 * | 3/1984 | ......... B29D 30/0685 |

(Continued)

OTHER PUBLICATIONS

Machine Translation: JPS5936675; Takusagawa, Takashi; no date.*

(Continued)

*Primary Examiner* — Robert C Dye
*Assistant Examiner* — Kendra Ly
(74) *Attorney, Agent, or Firm* — George W. Moxon, II; Brian P. Harrod

(57) ABSTRACT

A tire with a built-in puncture sealant comprising a supporting tire carcass comprised of one or more layers of ply, an outer circumferential tread, and a radially inner layer, a pair of beads, sidewalls extending radially inward from the axial outer edges of the tread portion to join the respective beads, a sealant comprising an outer layer of sealant and an inner layer of sealant, disposed inwardly from said tire carcass inner layer, wherein the outer layer of sealant and the inner layer of sealant have different viscosities, and wherein said sealant provides self-sealing properties to the tire.

16 Claims, 9 Drawing Sheets

(56) References Cited

U.S. PATENT DOCUMENTS

| | | |
|---|---|---|
| 6,962,181 B2 | 11/2005 | Deevers et al. |
| 7,073,550 B2 | 7/2006 | Reiter et al. |
| 7,332,047 B2 | 2/2008 | Majumdar |
| 7,419,557 B2 | 9/2008 | Majumdar |
| 7,674,344 B2 | 3/2010 | D'Sidocky |
| 8,021,730 B2 | 9/2011 | Tsou |
| 8,158,721 B2 | 4/2012 | Stevenson |
| 8,197,897 B2 | 6/2012 | Shibata et al. |
| 8,293,049 B2 | 10/2012 | Incavo |
| 8,316,903 B2 | 11/2012 | Majumdar |
| 8,347,930 B2 | 1/2013 | Kishizoe |
| 8,387,672 B2 | 3/2013 | Majumdar |
| 8,534,331 B2 | 9/2013 | Dubos et al. |
| 8,652,624 B2 | 2/2014 | Subramanian et al. |
| 8,691,373 B2 | 4/2014 | Soeda et al. |
| 8,726,955 B2 | 5/2014 | Majumdar et al. |
| 8,776,851 B2 | 7/2014 | Majumdar |
| 8,833,415 B2 | 9/2014 | Greiveldinger et al. |
| 8,841,359 B2 | 9/2014 | Hara |
| 2001/0018492 A1 | 8/2001 | Watanabe et al. |
| 2004/0149366 A1* | 8/2004 | Makino ................ B29C 73/20 152/505 |
| 2005/0113502 A1 | 5/2005 | Fitzharris Wall et al. |
| 2005/0215684 A1 | 9/2005 | Fitzharris Wall et al. |
| 2006/0174991 A1* | 8/2006 | Naito .................... B29C 73/20 152/504 |
| 2009/0084483 A1* | 4/2009 | Majumdar ......... B29D 30/0685 152/504 |
| 2009/0308517 A1 | 12/2009 | Nohara et al. |
| 2009/0311548 A1 | 12/2009 | Kirino |
| 2010/0071821 A1* | 3/2010 | Sekiguchi ............... B29C 73/20 152/504 |
| 2010/0154959 A1 | 6/2010 | Majumdar et al. |
| 2011/0024015 A1 | 2/2011 | Takahashi et al. |
| 2011/0126953 A1* | 6/2011 | Incavo .................. B29C 73/163 152/504 |
| 2011/0226399 A1* | 9/2011 | Majumdar ............ B29C 73/163 152/458 |
| 2012/0048441 A1 | 3/2012 | Takahashi et al. |
| 2013/0269850 A1 | 10/2013 | Seto et al. |
| 2013/0269852 A1 | 10/2013 | Endo et al. |
| 2014/0162079 A1 | 6/2014 | Subramanian et al. |
| 2014/0166176 A1 | 6/2014 | Rodgers et al. |

FOREIGN PATENT DOCUMENTS

| | | | |
|---|---|---|---|
| JP | 52049501 A | * | 4/1977 |
| JP | 54027105 A | * | 3/1979 |
| JP | 54029403 A | * | 3/1979 |
| JP | 59036675 B | * | 9/1984 |
| JP | 04005030 A | * | 1/1992 |

OTHER PUBLICATIONS

Machine Translation: JP-59036675-B; Takusakawa Takashi; (Year: 2019).*

Machine Translation: JP-54027105-A; Takiguchi, Eiji; (Year: 2019).*

Machine Translation: JP-54029403-A; Ogawa, Masaki; (Year: 2019).*

Machine Translation: JP-04005030-A; Ito, Shungo; (Year: 2019).*

Machine Translation: DE-102008003554-A1; Klingebiel Frank Stefan; (Year: 2019).*

"DuraSeal technology: Innovation from Goodyear pays dividends to Waste haulers", http://www.goodyearcom/cfmx/web/corporate/media/news/story.cfm?a_id=38.

"There's no time for downtime. DuraSeal Technology®", http://www.goodyeartrucktires.com/pdf/resources/publications/DuraSeal%20General%20Brochure.pdf.

* cited by examiner

PNEUMATIC TIRE HAVING MULTIPLE BUILT-IN SEALANT LAYERS AND PREPARATION THEREOF

BACKGROUND OF THE INVENTION

The present invention is directed to tires having inner sealant layers, and in particular to tires with multiple built-in sealant layers where at least one of them is formed from sealant precursor layers.

Tire puncture is an inherent issue for rubber tires. Because of that, sealants have been developed and placed in the inner tire to minimize the impact on the puncture. Further, punctures can occur at any temperature. A single layer of sealant of low viscosity may work very well at low temperature, but at high temperatures, it might achieve a very low viscosity, which would allow it to flow and pass out of tire during use. By depleting the tire sealant, the tire looses its puncture sealing capacity. Likewise, a single layer of sealant of high viscosity may be very good for high temperature but might be almost solid at cold temperature and thus unable to flow to plug puncture in tires at cold temperature.

Tires with built-in sealant layer are known in the art. Typically, these tire sealants are peroxide containing butyl-rubber-based sealant precursor layers, such as for example, U.S. Pat. Nos. 4,895,610; 6,962,181; 7,073,550; 7,674,344; and 8,293.049; and US Patent Publication Nos. 2005/0113502 and 2005/021568, the teachings of which are all hereby incorporated by reference. Sealant layers may be of black or non-black colors and may incorporate short fibers, such as polyester or polyurethane fibers, and other filler aggregate into sealant layers to help to plug nail hole punctures.

Tires using multiple layers are known, such as U.S. Pat. No. 8,387,672 to Majumdar where multiple layers are used and the layers are based on polyurethane sealant precursor where a non-woven layer is incorporated into it. The teaching is that the non-woven material is used to prevent leakage of polyurethane sealant plugs the puncture.

BRIEF SUMMARY OF THE INVENTION

A tire with a built-in puncture sealant comprising a supporting tire carcass comprised of one or more layers of ply, an outer circumferential tread, and a radially inner layer, a pair of beads, sidewalls extending radially inward from the axial outer edges of the tread portion to join the respective beads, a sealant comprising an outer layer of sealant and an inner layer of sealant, disposed inwardly from said tire carcass inner layer, wherein the outer layer of sealant and the inner layer of sealant have different viscosities, and wherein said sealant provides self-sealing properties to the tire.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
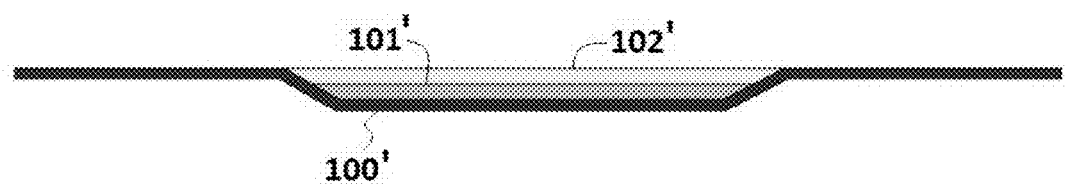
FIG. 1 is a cross-sectional view of the sealant and sealant cover layers.

The present invention is directed to a tire with a plurality of built-in sealant layers. The tire comprises a supporting tire carcass comprised of one or more layers of ply, an outer circumferential tread, and a radially innermost layer, a pair of beads, sidewalls extending radially inward from the axial outer edges of the tread portion to join the respective beads, a sealant layer comprising an inner liner, two or more layers of sealants, and a cover layer, disposed on said tire carcass innermost layer, wherein said inner liner is affixed to said tire carcass innermost layer, wherein the two or more layers of sealants are disposed between said inner liner and said cover layer, wherein the two or more layers of sealants comprise an inner layer and an outer layer and have different viscosities, wherein said sealant layer provides self-sealing properties to the tire.

The order of the layers of the tire anatomy, from outmost to innermost comprises: outermost layer is the tread layer, followed by a traditional tire carcass (including ply and belts), then an inner liner, the outer sealant layer, the inner sealant layer, and a protective cover layer as the innermost layer. An optional gas permeable layer can be disposed between the inner liner and the innermost layer of the tire carcass. The inner liner is permanently affixed, bonded, or joined to the inner surface of the tire carcass. The outer and inner sealant layers are used in reference to one another's relative position and are part of the internal structure of the tire. I.e. the outer sealant layer is not located on, or part of, the exterior/outside of the tire.

The present invention uses a sealant comprising a plurality of built-in puncture sealant layers in the form of an outer sealant layer and an inner sealant layer. The use of a plurality of layers provides much better performance than tires with one layer of sealant of equivalent total thickness. With the present invention, better puncture sealing efficiency is achieved when the outer sealant layer is the high viscosity sealant layer and the inner sealant layer is the low viscosity sealant layer (i.e. the high viscosity sealant layer is closer to the outer surface of the external tire tread, and the low viscosity layer is closest to center of the tire/the axis of rotation of the tire). The inner and outer sealant layers comprise predominantly degraded butyl rubber.

As used herein, the term "sealant precursor" means the compound by itself is not a sealant, but it is transformed into sealant by thermal degradation during high temperature tire cure step used in making the tire. The "precursor layer(s)" is the layer of sealant precursor. The precursor layer can be 100% butyl rubber or predominantly butyl rubber, comprising 80%-90% butyl rubber and can include up to approximately 5% diene-based elastomer. Butyl rubbers degrade during tire curing at high temperature to form low molecular weight tacky sealants. Multiple sealant layers can be placed inner to the tire inner liner where a sealant protective layer is applied to prevent fouling of tire curing bladder. Multiple sealant layers can also be sandwiched between tire inner liner and tire casing where no sealant protective layer is needed since the tire inner liner prevents bladder fouling. However, a squeegee layer is necessary between ply and sealant layer to prevent sealant travelling between the cords to the plies.

Any rubber based composition, such as natural rubber, butadiene rubber, styrene-butadiene rubber based composition, can be used for squeegee layer. For convenience, the composition of squeegee layer may be same as inner liner layer, however, the thickness should be much smaller as barrier property is not needed. Typically, squeegee layer should be less than 1 mm and between 0.5-1 mm. Thickness of conventional halo-butyl rubber-based inner liner layer should be around 1.5 mm for passenger tire and up to 4 mm for bigger tires, such as truck tires.

The low viscosity/inner sealant layer, has very low storage modulus (G') and it cannot be calendered or conveniently applied directly during tire building. To compensate for this, the build starts with a higher G' sealant precursor layer that degrades in-situ during tire cure, catalyzed by appropriate peroxide (discussed below), thus forming the lower G' sealant layer. Similarly, higher viscosity/outer sealant layer can be formed in-situ from sealant precursor layer. However, higher viscosity sealant layer has high enough G' to be applied directly during tire building without the need of thermal degradation by peroxide. The differing viscosities are achieved by varying or withholding the amount of peroxide.

A barrier layer, either the inner liner (see FIG. 2) or squeegee layer (see FIG. 3), is used to keep the sealants from being absorbed by fibrous material that reinforced tire tread. Such a layer is desired but not believed to be critical.

Any commercially available butyl rubber can be used as sealant precursor layer. A variety of butyl rubber with unsaturation levels 0.90-2.25 mol % and Mooney Viscosity (ML(1+8) 125° C.) in the range 33-51 MU (Mooney Units), such as are available from Lanxess, can be used. By heat in the presence of peroxide catalyst, butyl rubber degrade to lower Mooney Viscosity (ML(1+8) 125° C.) rubber with range in between 5-25 MU.

Besides butyl rubber, other rubbers that degrade by peroxide can be used as sealant precursor either alone or in combination with butyl rubber. One example of such rubber is brominated isobutylene-isoprene copolymer, available as X_BUTYL™ I4565P from Lanxess, can be used. This polymer has Mooney Viscosity (ML(1+8) 125° C.) in the range 52-60 MU. By heat in the presence of peroxide catalyst, X_BUTYL™ I4565P rubber degrade to lower Mooney Viscosity (ML(1+8) 125° C.) rubber with range in between 10-35 MU.

The higher viscosity sealant layer is predominantly composed of butyl rubber, brominated isobutylene-isoprene copolymer, and combinations thereof. It has a Mooney viscosity (ML(1+8) 125° C.) in the range 25-60 MU, so long as it has higher viscosity than the lower viscosity layer. (For example, if the high viscosity layer was 25 MU, the lower viscosity layer would have to be 24 MU or less.)

The present invention employs a standard tire-building process. After the green (uncured) tire is built, an optional protective film can be applied on the top of the innermost layer. The width of the film is slightly wider than the sealant layer (approximately 2 inches more on both sides). This film protects the tire curing bladder and keeps it clean in case the innermost sealant cover layer ruptures or tears in the mold.

Such films are known in the art. One such film is 2 mil undrawn nylon 6, 6 available as DARTEK® C900 from Coveris High Performance Packaging. About 1" (inch) of the film is overlapped at the end so that, after tire cure, it functions as a pull tab to facilitate easy removal. Such a system is described in U.S. Pat. No. 7,332,047 to Majumdar, Logan, and Lukich, and is hereby incorporated herein by reference. The protective film can also be applied as first layer in tire building drum. For convenience, the two edges of the film are preferentially coated with a pressure-sensitive adhesive (PSA)-coated thermoformable film. Such a system is described in U.S. Pat. No. 7,419,557 to Majumdar and Page, and is hereby incorporated herein by reference. Although the film is not critical, Dynamically Vulcanized Alloy (DVA) film is preferred in tire building drum over nylon-6,6 film because DVA has significantly lower low strain modulus and hence can expand using less forces. Such a material is described in U.S. Pat. No. 8,776,851 to Majumdar, and is hereby incorporated herein by reference. Other examples are U.S. Pat. Nos. 8,021,730 and 8,158,721. An activating agent for organoperoxide can be added in the sealant composition for faster degradation. Such a method is described in U.S. Pat. No. 7,674,344 to D'Sidocky et al., and is hereby incorporated herein by reference.

The present invention incorporates an inner liner and sealant precursors. The inner liner comprises bromobutyl rubber, carbon black, naphthenic oil, stearic acid, phenolic resin tackifier, mixture of dark aromatic hydrocarbon resins (as found in STRUKTOL® 40 MS resin, manufactured by Struktol Company of America), MgO, ZnO, Sulfur, 2,2'-dithiobis(benzothiazole) (commonly sold as MTBS). The sealant precursors comprise butyl rubber, bromobutyl, polybutadiene, paraffinic oil, silica, clay, titanium dioxide, talc, phthalo/diarylide color concentrate dye/pigment (such as AKROSPERSE® E2295 Green manufactured by Akrochem Corporation), orange pigment (such as AKROSPERSE® E6615 Orange manufactured by Akrochem Corporation), blend of fatty acid derivatives processing additives (such as STRUKTOL® HPS 11 processing additive manufactured by Struktol Company of America), in the first non-productive (NP) mixing pass. Organic peroxide, such as n-butyl 4,4-bis(t-butyl-peroxy)valerate (such as TRIGONOX® 17-40B-GR manufactured by AkzoNobel) can be added in the final productive (PR) pass.

Preferably the tire of the present invention is prepared in the following way:
1. A sealant cover layer having formulation shown in Table 1 is mixed and calendered to a thickness of 1 mm, and a width equal to the inner liner width.
2. A precursor for low viscosity sealant having formulation shown in Table 2 is mixed and calendered to a thickness of 3 mm thick, and a width equal to the tread width less about 15 mm (i.e., tread width minus 15 mm).
3. Next, a precursor for high viscosity sealant having the formulation shown in Table 2 is mixed and calendered to a thickness of 3 mm thick and a width equal to tread width.
4. The sealant cover layer (#1 above) is applied to the tire building drum.
5. Next, the precursor for low viscosity sealant (#2 above) is applied to the tire building drum.
6. Next, the precursor for high viscosity sealant (#3 above) is applied to the tire building drum.
7. Next, the inner liner is applied in a tire building drum as in typical tire building process followed by the rest of the layers employed in a normal tire build.

An alternate embodiment comprises following the steps noted above, but modified such that instead of using low and high viscosity sealant layers, use a three or more intermediate layers of intermediate viscosities.

TABLE 1

Seealant cover layer

| Ingredient | Parts per Hundred Rubber (PHR) |
|---|---|
| Bromobutyl rubber | 100 |
| Carbon black | 55 |
| Naphthenic Oil | 6 |
| Stearic Acid | 1 |
| Phenolic resin tackifier | 4 |
| STRUKTOL ® 40 MS Resin | 8 |
| MgO | 0.15 |
| ZnO | 2.0 |
| Sulfur | 0.5 |
| MBTS (2,2'-Dithiobis(benzothiazole)) | 1.5 |

TABLE 2

Two sealant precursors

| | | 4C014A | 4C014B |
| | | Viscosity after sealant formation | |
| Component | Stage | Low | High |
|---|---|---|---|
| Butyl Rubber | NP | 100.00 | 100.00 |
| Bromobutyl | | 5 | 0 |
| Polybutadiene | | — | 5 |
| Paraffinic oil | NP | 13.00 | 13.00 |
| Silica | NP | 20.00 | 20.00 |
| Clay | NP | 10.00 | 10.00 |
| Titanium Dioxide | NP | 2.0 | 2.0 |
| Talc | NP | 0.5 | 0.5 |
| AKROSPERSE ® E2295 Green | NP | 1.0 | — |
| AKROSPERSE ® E6615 Orange | NP | — | 1.00 |
| STRUKTOL ® HPS 11 | | 2 | 2 |
| n-butyl 4,4-bis(t-butyl-peroxy)valerate | PR | 12 | 6 |
| TOTAL | | 165.5 | 159.5 |

For ease of illustration, some internal materials of the tire have been omitted from some of the drawings, such as belts and plies, but they remain in the finished tire.

Referring now to FIG. 1, which is a simplified illustration of the sealant and sealant cover layers, where the layers are not shown to scale since it is the ordering of the layers, not the specific widths and thicknesses that is important. The width can range from full tire width, down to a small strip along the center of the tire. A first sealant precursor layer 101' and second sealant precursor or direct sealant layer 102' and sealant cover layer 100' are shown in a general form. In a preferred embodiment, the inner sealant precursor layer 101' forms lower viscosity than the outer layer 102'. During a puncture, the sealants 101, and/or 102 (See FIG. 6) flow into the hole, filling it. The cover layer 100 may stretch and cover/plug the hole from the inside of the tire depending on tire internal temperature and diameter of puncture.

Figure 2:
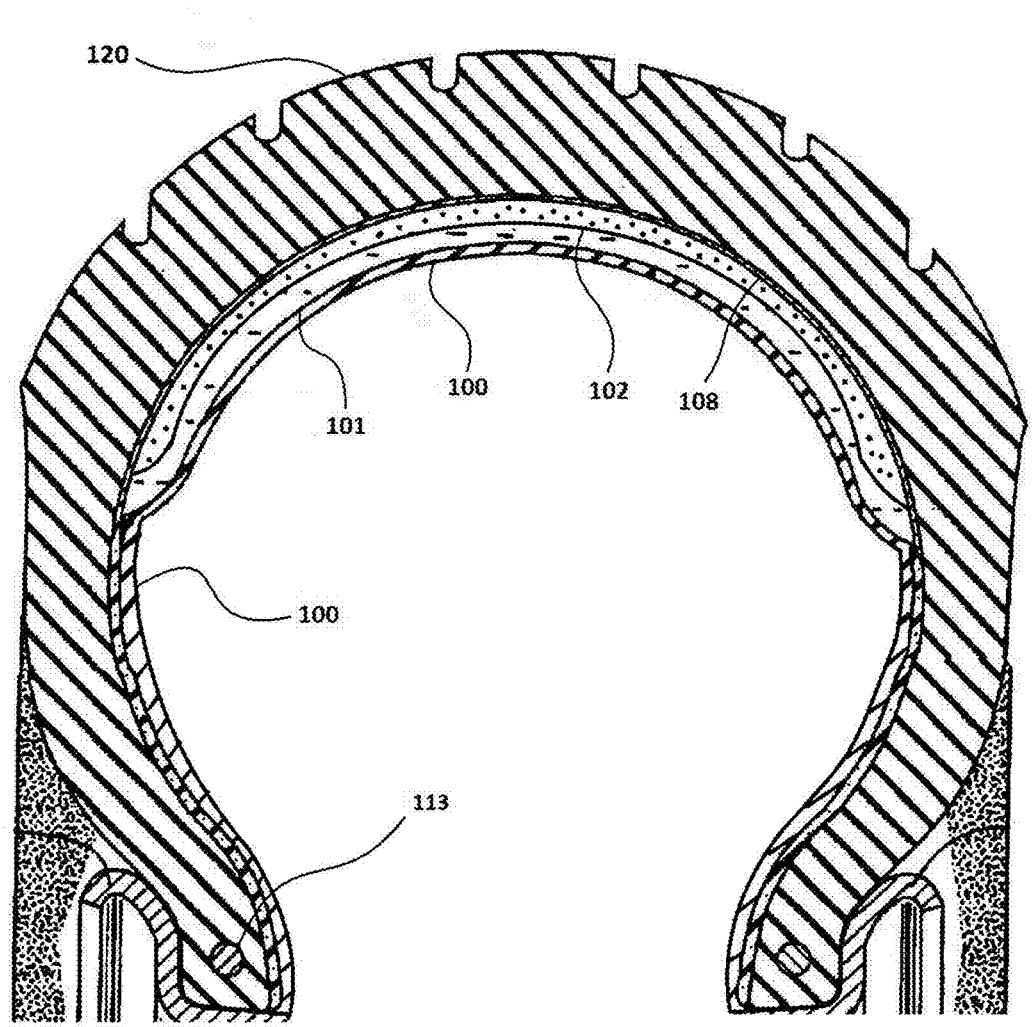
FIG. 2 is a cross-sectional view of a tire using the present invention.

FIG. 2 shows sealant layers of FIG. 1 in a tire. Low viscosity inner layer of sealant 101, and high viscosity outer layer of sealant 102 (formed from precursor layers 101', 102', respectively, see FIG. 1) are inner to inner liner 108, (i.e. closer to the tire's center) and a sealant cover layer 100 is needed. Cover layer 100 extends the width of the tire to the beads 113. The outermost layer is the tire tread 120. Optionally a nylon film (not shown) can be placed inner to sealant cover layer and covering the sealant layer underneath the sealant cover layer. The purpose of the nylon film is to prevent sealant leakage in case of crack in sealant cover layer. The nylon film would need to be removed after the tire is cured.

Figure 3:
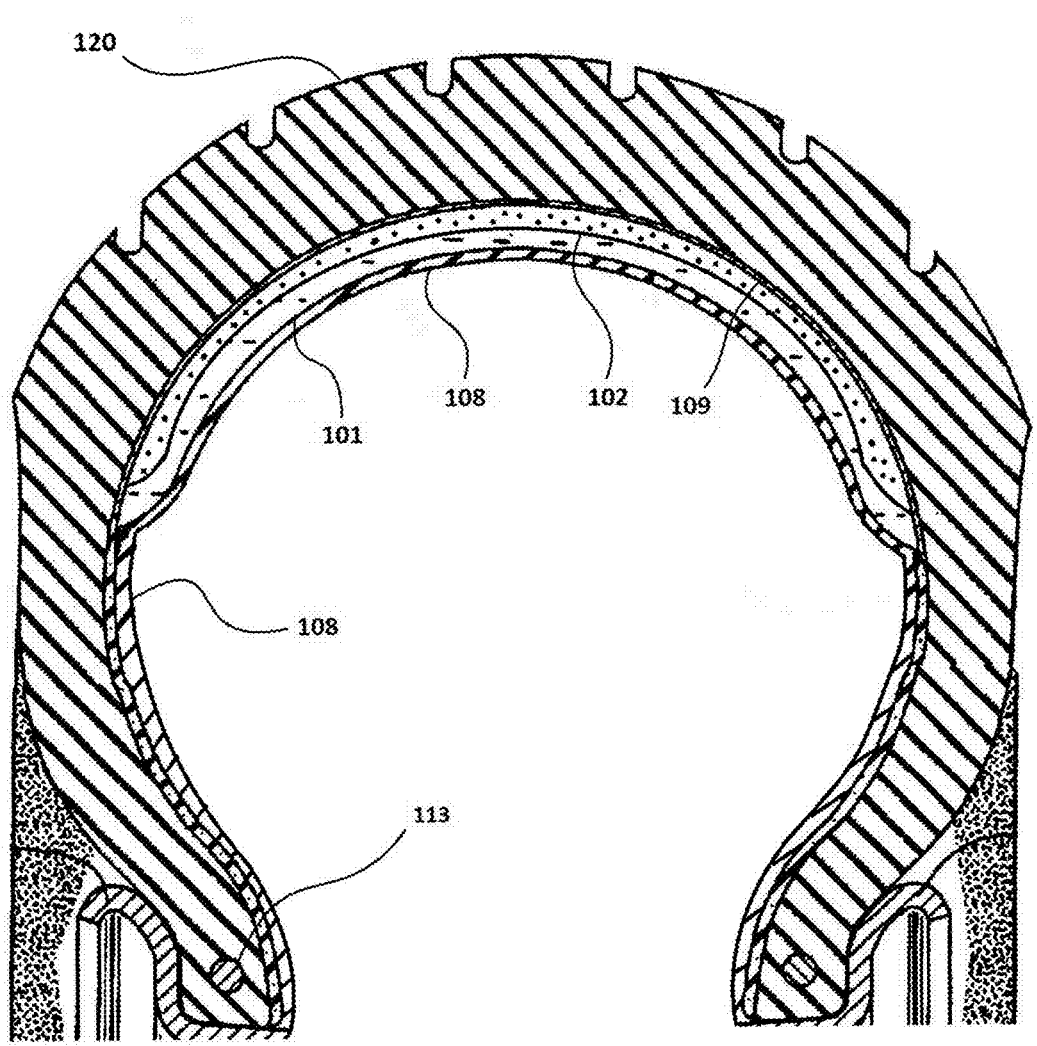
FIG. 3 is a cross-sectional view of a tire showing an alternate embodiment of the present invention.

FIG. 3 is an alternate embodiment of the tire depicted in FIG. 2. In this embodiment, the inner liner 108 is inner to the sealant layers 101, 102. This arrangement requires a squeegee layer 109, as discussed above.

Figure 4:
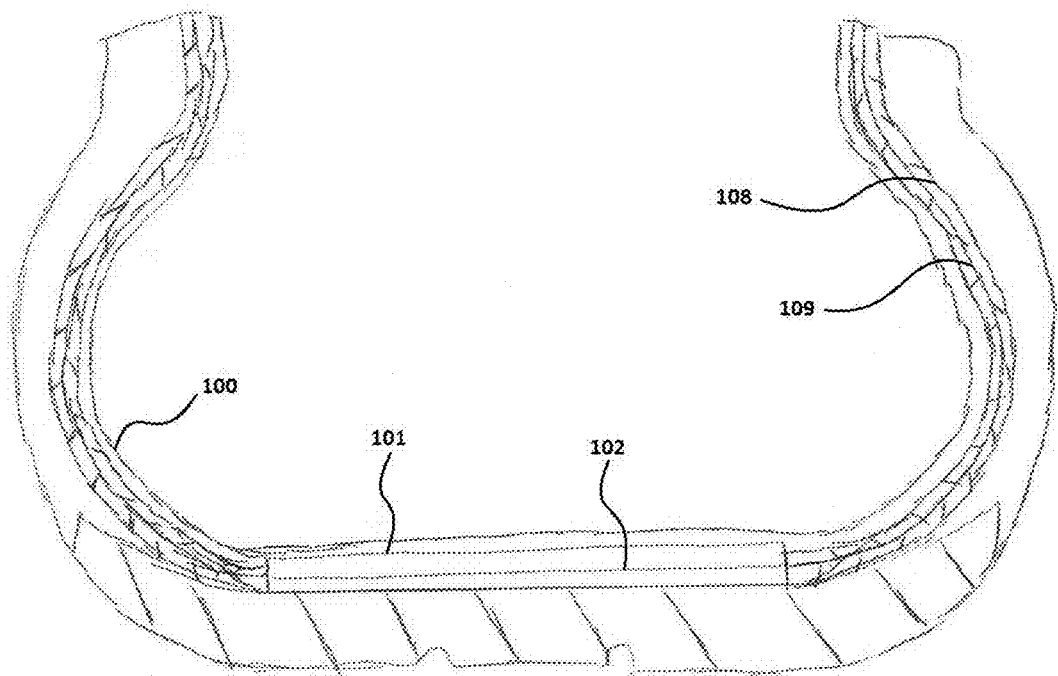
FIG. 4 is a cross-sectional view of a tire showing an alternate embodiment of the present invention.

FIG. 4 shows an alternate embodiment of the present invention wherein the sealant layers 101, 102 are embedded into the tire, such that the cover layer 100 is flush with the inside of the tire. Sealant is composed of butyl rubber which is also a good barrier, so an additional inner liner layer underneath the sealant is not needed. Such an arrangement results in material saving and lower weight tire.

Figure 5:
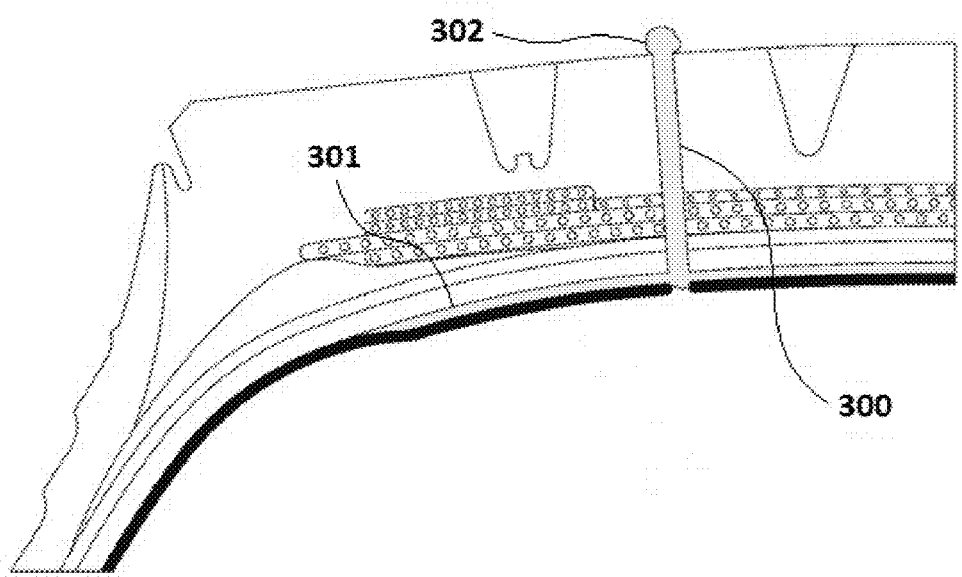
FIG. 5 is a partial cross-sectional view of a punctured tire and illustrating the prior art.
Figure 5A:
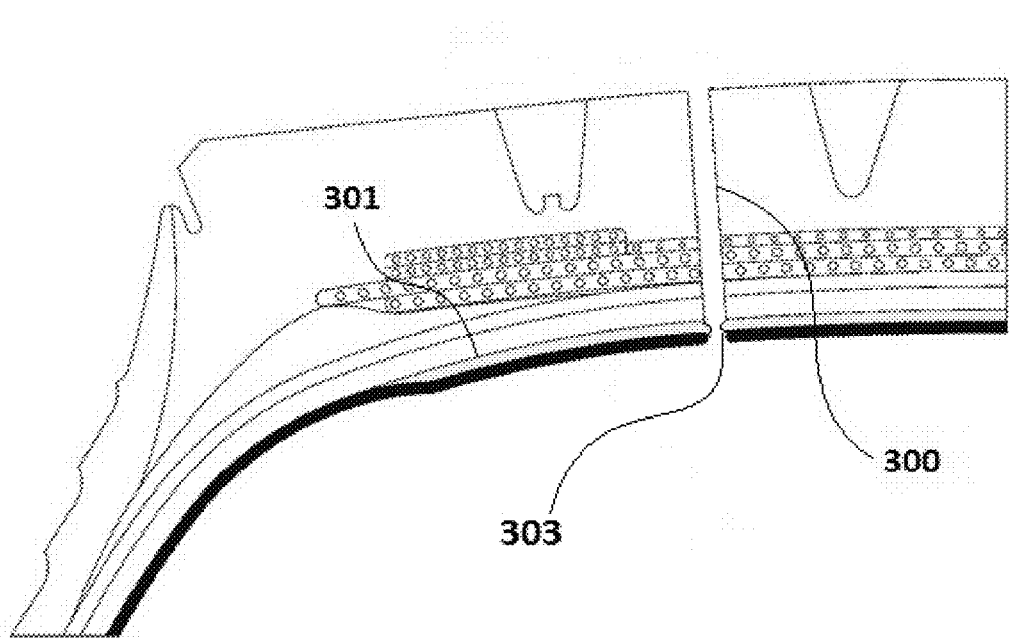
FIG. 5A is a partial cross-sectional view of a punctured tire and illustrating the prior art.

A single layer of sealant of low viscosity may be good for low temperature but at high temperature it may leak out, as shown in FIG. 5. High temperatures reduce the viscosity of the sealant layer 301, such that it could cause leakage 302 through the tire puncture opening 300 and eventually run out of tire during use, thus impairing nail hole sealing capability. This would also contaminate roadways. Likewise, a single layer of sealant of high viscosity may be very good for high temperature and the same sealant may be almost solid at cold temperature and cannot flow to plug puncture in tires at cold temperature, as shown in FIG. 5A. Low temperatures increase the viscosity of the sealant layer 301, such that it does not flow, or flows only slightly, creating minimal sealant bulges 303, leaving an air gap and failing to seal the tire puncture opening 300.

In typical puncture sealing tires, such as GOODYEAR DURASEAL® tires, e.g. U.S. Pat. Nos. 4,895,610, 4,359,078, 6,962,181, USPP 2005/0113502, 2005/0215684 the sealant layer sandwiched between thick inner liner and casing. In this case, the inner liner is very thick and cannot stretch and plug the punctures.

Figure 6:
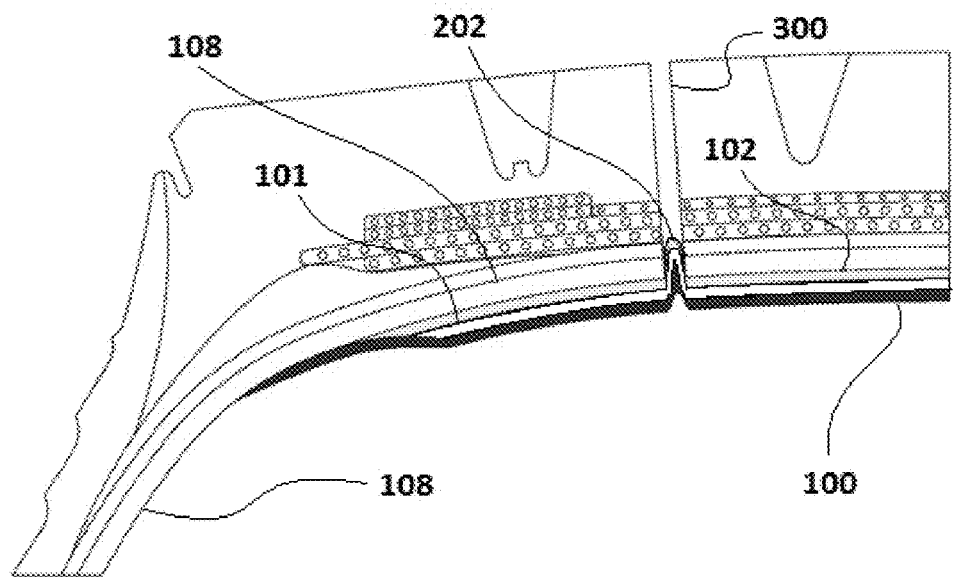
FIG. 6 is a partial cross-sectional view of a punctured tire using the present invention.

As shown in FIG. 6 one of the embodiments of the present invention uses a sealant layer that is inner to inner liner 108 and protected with low modulus thin sealant cover layer 100. When a puncture occurs, the high viscosity layer 102 and low viscosity layer 101 flow into the puncture hole 300. This creates a sealant plug 202, which prevents deflation. Further, depending on temperature and puncture hole diameter the protective layer 100 may stretch and plug big tire punctures permanently.

Figure 7:
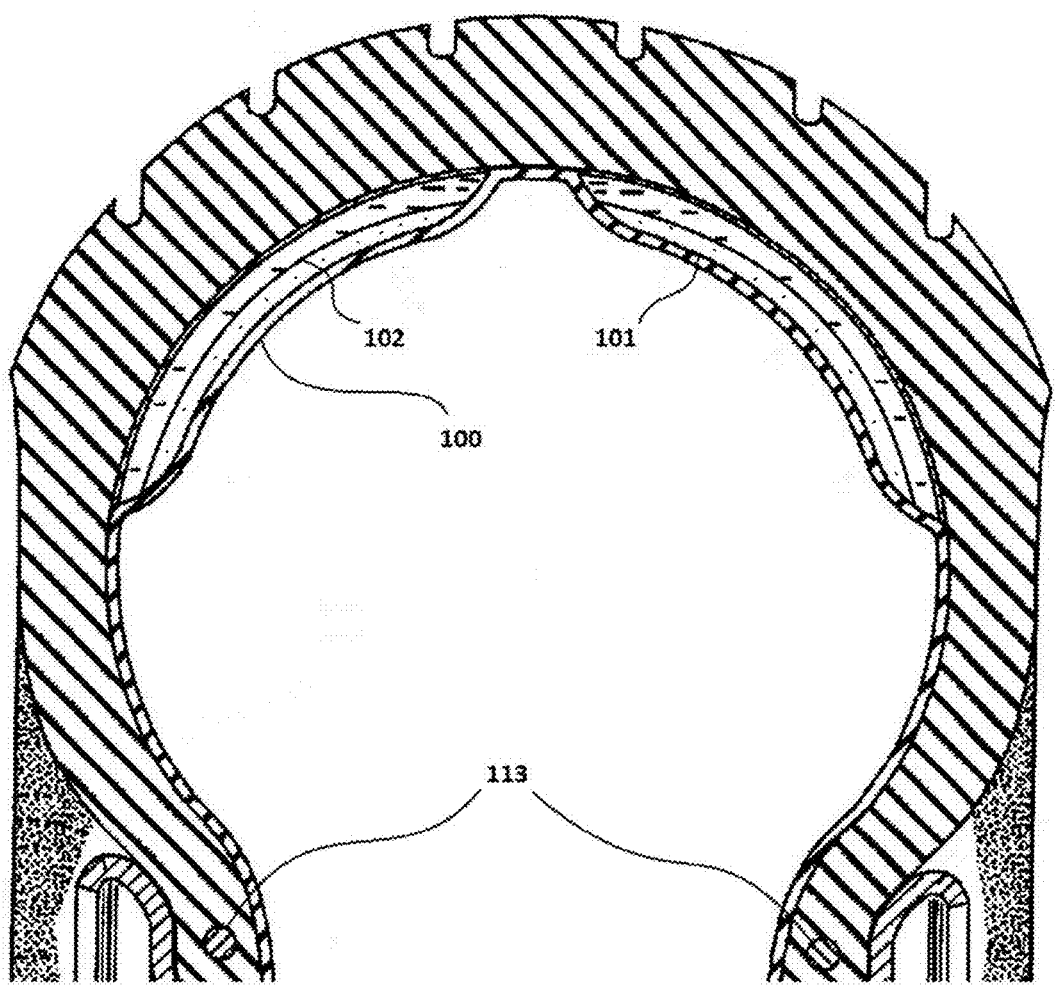
FIG. 7 is a cross-sectional view of a tire showing an alternate embodiment of the present invention.
Figure 8:
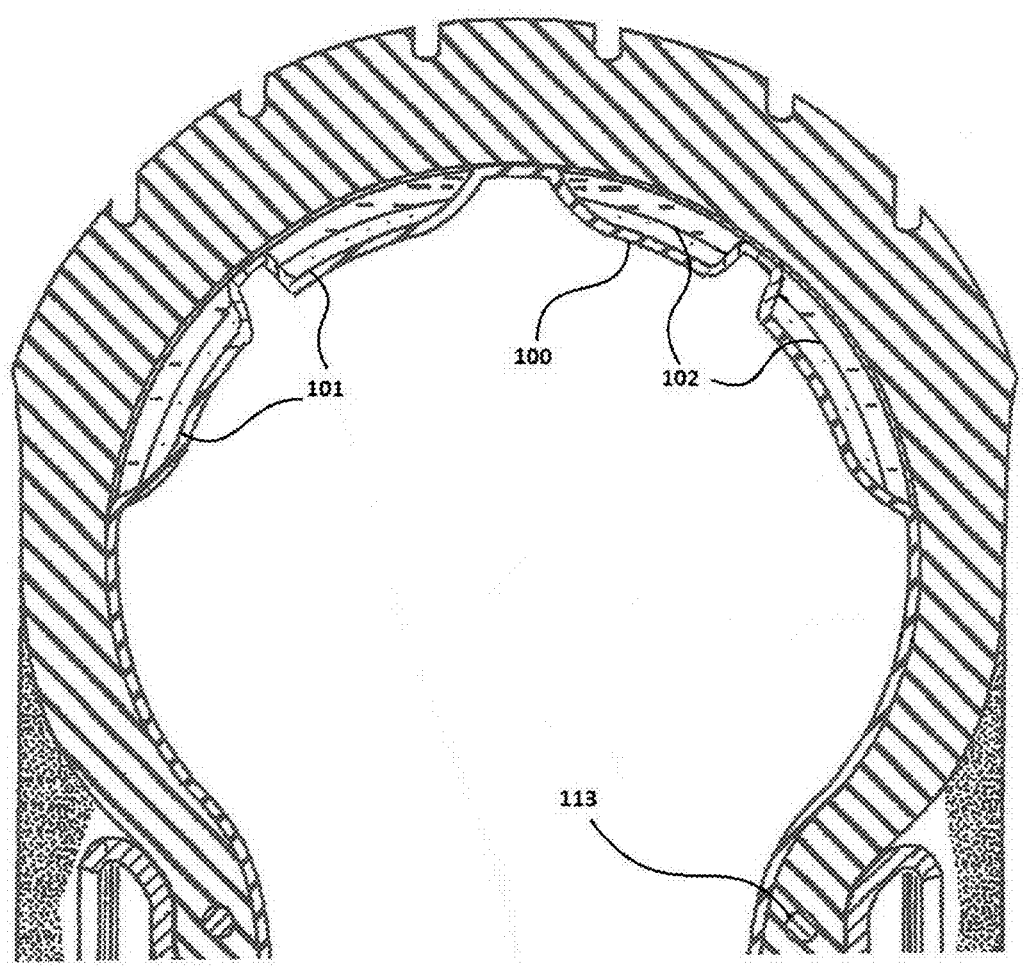
FIG. 8 is a cross-sectional view of a tire showing yet another alternate embodiment of the present invention.

FIG. 7 shows an alternate embodiment of the present invention where sealant layers 101, 102, are in two separate compartments which will reduce sealant movement during tire use. In other words, the sealant is split into two or more parallel circumferential bands. Likewise, sealant layers can be in four compartments, as shown in FIG. 8, where the two or more parallel circumferential bands from FIG. 7 comprise four bands. Generally nails enter through tread grooves and the attachment of sealant cover or inner liner should be underneath tread lug. This will reduce the overall amount of sealant needed in a tire.

The following examples illustrate the present invention and how it relates to similar tires on the market.

Example 1

Preferred Method of Sealant Tire Building

Truck Bus Radial (TBR) tire of size 215/17R17.5 was built. First applied sealant cover layer of same width as inner liner was applied to tire building drum, then two layers of low viscosity sealant precursor B and then two layers of higher viscosity sealant precursor 4C014A. The widths of sealant precursor layers were approximately same as tread width. Then full width inner liner was applied followed by other normal layers for tire build. After green tire was built, 2 mm Dartek C917 film was applied on the top of sealant cover layer covering the sealant precursor underneath followed by curing. After cure, Dartek C917 film was removed before testing. When the tire came out from press, there was initial bulging of sealant cover layer which later receded once the tire cooled.

Uniformity Test

FDBRC-6142TD-R from KOKUSAI was used for tire uniformity test. The tire with sealant layer had uniformity A.

Nail Hole Sealant Tests

It was done after inflating the tire to 116 psi. This tire passed nail hole test with 12d and 16d nails but failed with 20d nail. Nails of sizes 12d, 16d and 20d have respective diameters of 0.148, 0.162 and 0.192 inches or 3.8, 4.1 and 4.9 millimeters.

Sealant Thickness Cured Tire

The tire was cut and the sealant thickness was determined to be 4 mm.

Example 2

Nail Hole Sealing Capability with Single Layer of Sealants VS Two Layers

215/75R17.5 TBR Tires were built with one layer of sealant and two layers of sealant of equal combined thickness as shown in Table 3.

No. 1A and 1B of Table 3 shows puncture sealing properties of combination of two different sealant layers (4C014A and 4C014B) of total thickness 4.8 mm. Both sealed holes inflicted by 20d nails when applied on tread lug. 1A failed to seal hole inflicted by 20d nail on tread groove while 1B successfully sealed hole inflicted by 20d nail on tread groove. This suggests that lower viscosity sealant is preferred as the layer inner to the higher viscosity sealant. This also suggests that the lower viscosity sealant helps push the higher viscosity sealant into the nail hole thus plugging the nail hole without oozing out of the outer tread surface.

No 1C and 1D of Table 3 has one viscosity sealant (like Goodyear's Duraseal tires and others with reference 1-11) of total thickness 4.8 mm. Both the sealants showed inferior nail hole puncture sealing capability compared to combination of two viscosity sealant layers 1A and 1B of equivalent total thickness.

TABLE 3

Puncture Testing of 215/75R17.5 TR685 TBR Tire with Sealant Layers

| | Nail in Groove | | | Nail in Lug |
|---|---|---|---|---|
| No Sealant Layer | 12 d | 16 d | 20 d | 20 d |
| 1A Inner liner<br>3.2 mm 4C014A (Low Viscosity)<br>1.6 mm 4C014B (High Viscosity)<br>4C013B (Cover layer)<br>PRESENT INVENTION | Passed | Passed | Failed | Passed |

TABLE 3-continued

Puncture Testing of 215/75R17.5 TR685 TBR Tire with Sealant Layers

| | Nail in Groove | | | Nail in Lug |
|---|---|---|---|---|
| No Sealant Layer | 12 d | 16 d | 20 d | 20 d |
| 1B Inner liner<br>1.6 mm 4C014B (High Viscosity)<br>3.2 mm 4C014A (Low Viscosity)<br>4C013B (Cover layer)<br>PRESENT INVENTION | Passed | Passed | Passed | Passed |
| 1C Inner liner<br>4.8 mm 4C014A (Low Viscosity)<br>4C013B (Cover layer)<br>PRIOR ART (1-11) | Failed | — | — | Failed |
| 1D Inner liner<br>4.8 mm 4C014 B (High Viscosity<br>4C013B (Cover layer)<br>PRIOR ART (1-11) | Passed | Failed | — | Passed |

Example 3

Sealant Cover Layers

Identical tires were made by varying the sealant cover layers as shown in Table 4. Table 5 shows that sealant came out from tread when 4C013A sealant cover was used. Sealant did not come out when 90BIIR/10CSM sealant cover layer was used where BIIR is bromobutyl and CSM is chlorosulfonated polyethylene. Composition of 90BIIR/10CSM is similar as composition in Table 1 except that 100 BIIR is replaced with 90BIIR and 10CSM. Cut tire showed that when 90BIIR/10CSM was used, sealant cover layer stretched and plugged the nail hole. This did not occur when 4C013A sealant cover layer was used as the M100 was very high (2.99 MPa) and it takes a lot of force to stretch.

Low M100 sealant cover can also be compounded using conventional rubber without butyl or halobutyl as shown in Tables 7 and 8.

Current commercial Duraseal tires use very thick inner liner which cannot stretch and plug the nail hole.

In the present invention, when a sealant cover layer was used, it has 100% modulus of 1.6 MPa (range 0.5-2.5 MPa and preferably 1.2-1.9 MPa).

TABLE 4

Properties of two different sealant cover layer

| A3T ID | 4C013A | 90BIIR/10CSM |
|---|---|---|
| Tensile (MPa) | 17.0 | 9.3 |
| E (%) | 446 | 642 |
| M100 (MPa) | 2.99 | 1.6 |
| M300 (MPa) | 8.65 | 4.3 |

TABLE 5

Puncture Testing of 315/80R22.5 Tires with two different sealant cover layer

| No Sealant Layer | Nail hole testing | Comments |
|---|---|---|
| 2F 14 cm × 14 cm Orange 4C014B<br>2X (14 cm × 14 cm Green 4C014A | 12 d - Passed<br>16 d Passed | Some sealant<br>came out on |

TABLE 5-continued

Puncture Testing of 315/80R22.5 Tires with two different sealant cover layer

| No | Sealant Layer | Nail hole testing | Comments |
|---|---|---|---|
| | 20 cm × 20 cm 4C013A | 20 d - Passed | surface with 16 d and 20 d |
| 2G | 14 cm × 14 cm Orange 4C014B | 12 d - Passed | No sealant came out of tread |
| 2X | (14 cm × 14 cm Green 4C014A | 16 d Passed | |
| | 20 cm × 20 cm 90BIIR/10 CSM | 20 d - Passed | |
| | (GM in-line inner liner) | | |

TABLE 6

Examination of Inner Liner of 315/80R22.5 Tires after Puncture Test

| No | Innermost Layer | Nail | Condition of Innermost layer |
|---|---|---|---|
| 2F | 4C013A | 12 d | Inner most layer did not stretch to plug the nail hole |
| | | 16 d | |
| | | 20 d | |
| 2G | 90BIIR/10CSM | 12 d | Inner liner stretched and plugged the nail hole |
| | | 16 d | |
| | | 20 d | |

TABLE 7

Mixing of two red innermost sealant cover layer

| Ingredient | Stage | 4C013A Amount (phr) | 4C022A Amount (phr) |
|---|---|---|---|
| Natural Rubber | NP1 | 70.00 | 70.00 |
| SBR-1502 | NP1 | 30.00 | 30.00 |
| Silane treated clay | NP1 | 27.5 | 27.5 |
| Titanium Dioxide | NP1 | 5 | 5 |
| Hi-Sil135 (150 BET) | NP1 | 32.00 | — |
| Ultra-Sil 360 (55 BET) | NP1 | — | 16 |
| Medium Process Oil | NP1 | 1.00 | 1.00 |
| Stearic Acid | NP1 | 1.5 | 1.5 |
| Polymeric hindered phenol | NP1 | 1.5 | 1.5 |
| Zinc Oxide | NP1 | 20 | 20 |
| Red Rubber Concentrate | NP1 | 1.00 | 2.00 |
| Total NP1 | | 190.5 | 189.5 |
| NP1 | PR | 190.5 | 189.5 |
| Diphenyl Guanidine | PR | 0.20 | 0.20 |
| Benzothiazyl disulfide (MBTS) | PR | 2.00 | 2.00 |
| Insoluble Sulfur | PR | 1.83 | 0.6 |
| ZBED | PR | 0.75 | 0.75 |
| TBzTD | PR | 1.00 | 1.00 |
| TOTAL | | 196.28 | 194.05 |

TABLE 8

Properties Red Rubber Compound of Table 7

| A3T ID | 4C013A | 4C022A |
|---|---|---|
| ODR at 302° F./R100/18-24'/3°Arc | | |
| Ts2 (min) | 3.45 | 4.56 |
| Tc90 (min) | 12.18 | 11.27 |
| ML | 11.42 | 10.19 |
| MH | 80.12 | 59.38 |
| Δ Torque | 68.70 | 49.19 |
| Cured Property (7 min at 320° F.) | | |
| Duro | 62 | 48 |
| Tensile (MPa) | 17.0 | 18.5 |
| E (%) | 446 | 588 |
| M100 (MPa) | 2.99 | 1.5 |
| M200 (MPa) | 5.58 | 2.9 |
| M300 (MPa) | 8.65 | 4.6 |
| Tear, Die C (lbs/inch) | 162 | 155 |
| Estimated Sp. Gravity | 1.315 | 1.281 |
| Green Strength | | |
| Tensile (MPa) | 0.40 | 0.57 |
| % Elongation | 942 | 995 |
| M100 (MPa) | 0.35 | 0.29 |
| M200 (MPa) | 0.33 | 0.28 |
| M300 (MPa) | 0.33 | 0.30 |
| Mooney Viscosity | | |
| ML (1 + 4) at 212° F. | 50.05 | 35.61 |
| Scorch at 250° F. | | |
| T5 (min) | 25.48 | 26.24 |
| Minimum Viscosity | 39.99 | >26 |

Example 4

RPA Measurements of Sealants

Rubber Process Analyzer (RPA) is widely used in rubber industry. The RPA-2000 model can be purchased from Alpha Technologies. It measures rubber properties before cure, during cure and after cure.

Following was RPA test conditions of 4 sealants and one sealant cover and the results are shown respectively in Tables 9 and 10.

Step #1—80° C., 5% strain, 1 Hz and determine storage modulus

Step #2—heat the sample for 12 minutes at 170° C., 5% strain, 1 Hz

Step #3—Cool to 80° C. and repeat step #1

Step #4—Cool to 35° C. and repeat step #1

Storage modulus (G') can be related to viscosity of material. In Table 9, before heat, G' values are for sealant precursors. After heat, G' are for sealants. Four sealants have G' values at 35° C. in the range 0.056-0.406 MPa. Same four sealants have G' values at 80° C. in the range 0.01-0.194 MPa. If 0.3-0.41 G' is best for sealing nail hole, then sealant RC4C014 is desired if puncture occurs at 35° C. while 4C021B is desired if puncture occurs at 80° C. This data shows that two layers of sealant of different viscosities are preferred over one viscosity sealant as puncture can occur at different temperatures.

Before heat G' of one of the sealant cover layer (Table 10) at 80° C. is lower than G' at 80° C. of high viscosity sealant layer after heat (0.144 MPa vs 0.194 MPa) (Table 9). This shows that high viscosity sealant layer can be formulated without the need of any peroxide or curatives. One example of such high viscosity sealant layer is NP1 of 4C022A without the curatives as shown in Table 7.

TABLE 9

RPA of the Four Sealant Layers in the Ascending Order of G' at 35° C. after Thermal Breakdown

| Compound | Before Heat at 80° C. G' (MPa) | Before Heat at 80° C. Tan δ | After Heat at 80° C. G' (MPa) | After Heat at 80° C. Tan δ | After Heat at 35° C. G' (MPa) | After Heat at 35° C. Tan δ |
|---|---|---|---|---|---|---|
| RC4C014D | 0.245 | 0.302 | 0.194 | 0.555 | 0.406 | 0.349 |
| RC4C014C | 0.237 | 0.305 | 0.059 | 0.891 | 0.196 | 0.627 |
| 4C021B = 4C014B | 0.149 | 0.334 | 0.035 | 1.037 | 0.134 | 0.55 |
| 4C021A = 4C014A | 0.149 | 0.338 | 0.010 | 1.449 | 0.056 | 1.072 |

TABLE 10

RPA Results of Sealants Cover Layer

| Compound | Before Heat at 80° C. G' (MPa) | Before Heat at 80° C. Tan δ | After Heat at 80° C. G' (MPa) | After Heat at 80° C. Tan δ | After Heat at 35° C. G' (MPa) | After Heat at 35° C. Tan δ |
|---|---|---|---|---|---|---|
| 4C022A | 0.144 | 0.493 | 0.567 | 0.047 | 0.511 | 0.077 |

Example 5

Storage Modulus Range of High and Low Viscosity Sealants

Tables 11 and 12 shows tire tests where different ranges of high and low viscosity sealants were used. G' after heat is related to viscosity of sealant. Eight tests are shown in Tables 11 and 12. For high viscosity sealant, G' is in the range 0.405 MPa-0.134 and for low viscosity sealant, G' is in the range 0.196-0.056 MPa. As the tables show, G' at 35° C. of high viscosity sealant is in the range 0.5-0.1 MPa. This kind of material can be made without the need of any peroxide or curative. G' at 35° C. of low viscosity sealant is in the range 0.3-0.02 MPa. This kind of material can only be generated from precursor with peroxide as otherwise it will be very difficult to process.

Peroxide catalyst is used for degradation of butyl rubber to low molecular weight rubber. The catalyst must be stable at room temperature. The catalyst should also degrade below tire cure temperature i.e. 150° C. In other words, we can use one or more peroxide catalyst that has Self-Accelerated Decomposition Temperature (SADT) in the range 50-140° C. Some examples of such catalysts that we can use are as follows:

| Peroxide | SADT (° C.) |
|---|---|
| Val 40 from Akrochem | 75 |
| n-Butyl-4,4'-di(t-butylperoxy)valerate | |
| Luperox 101 from Arkema | 80 |
| DDPH-50 from Akrochem | |
| Trigonox ® 101 from AkzoNobel | |
| 2,5-Di(t-butylperoxy)2,5-dimethyl hexane | |
| Di-Cup 40KE | 93 |
| Dicumyl peroxide | |
| Vul-Cup 40KE | 70 |
| 1,3- or 1.4-Bis(tert-butylperoxyisopropyl)benzene | |

Sealant precursor compositions are shown in Tables 13 and 14.

TABLE 11

Sealant and Sealant Cover Layers Inner to Tire Inner Liner in a 315/80R22.5 Tire. The Tire Passed Punctures Inflicted by 20 d Nail when inflated to standard 0.83 MPa (120 psi)

| | | # 1 | # 2 | # 3 | # 4 |
|---|---|---|---|---|---|
| High Viscosity Sealant Layer | ID | R4C014D | R4C014D | R4C014F | R4C014F |
| | Thickness | 1.5 mm | 1.5 mm | 1.5 mm | 1.5 mm |
| | G' at 35° C. | 0.405 MPa | 0.405 MPa | — | — |
| | G' at 80° C. | 0.194 MPa | 0.194 MPa | — | — |
| Low Viscosity Sealant Layer | ID | R4C014C | R4C014C | R4C014E | R4C014E |
| | Thickness | 3.0 mm | 1.5 mm | 3.0 mm | 3.0 mm |
| | G' at 35° C. | 0.196 MPa | 0.196 MPa | — | — |
| | G' at 80° C. | 0.059 MPa | 0.059 MPa | — | — |
| Sealant Cover | ID | GM | GM | GM | GM |
| | Thickness | 1 mm | 1 mm | 1 mm | 1 mm |

TABLE 12

Sealant and Sealant Cover Layers in a Tire Inner to Tire Inner Liner that Sealed Punctures Inflicted by 20 D Nail

| | | # 5 | # 6 | # 7 | # 8 |
|---|---|---|---|---|---|
| High Viscosity Sealant Layer | ID | R4C014C | R4C014C | 4C014B | 4C014B |
| | Thickness | 1.5 mm | 1.5 mm | 1.5 mm | 1.5 mm |
| | G' at 35° C. | 0.196 MPa | 0.196 MPa | 0.134 MPa | 0.134 MPa |
| | G' at 80° C. | 0.059 MPa | 0.059 MPa | 0.035 MPa | 0.035 MPa |
| Low Viscosity Sealant Layer | ID | R4C014E | R4C014E | 4C014A | 4C014A |
| | Thickness | 3.0 mm | 1.5 mm | 3.0 mm | 1.5 mm |
| | G' at 35° C. | — | — | 0.056 | 0.056 |
| | G' at 80° C. | — | — | 0.010 | 0.010 |
| Sealant Cover | ID Thickness | GM | GM | GM | GM |

TABLE 13

Compositions of two sealant precursors

| | Stage | First Time Mixed for Weihai 4C014A | First Time Mixed for Weihai 4C014B |
| --- | --- | --- | --- |
| | | Second Time Mixed for RPA 4C021A | Second Time Mixed for RPA 4C021B |
| Butyl Rubber | NP | 100.00 | 100.00 |
| Bromobutyl | | 5 | 0 |
| Polybutadiene | | — | 5 |
| Paraffinic oil | NP | 13.00 | 13.00 |
| Silica (higher particle size) - Silene 732D | NP | 20.00 | 20.00 |
| Clay | NP | 10.00 | 10.00 |
| Titanium Dioxide | NP | 2.0 | 2.0 |
| Talc | NP | 0.5 | 0.5 |
| Akrosperse E2295 Green | NP | 1.0 | — |
| Alcrosperse E6615 Orange | NP | — | 1.00 |
| HPS11 | | 2 | 2 |
| NP | PR | | |
| VAL-40C | PR | 12 | 6 |
| TOTAL | | 165.5 | 159.5 |

TABLE 14

Compositions of four additional sealant precursors

| | R4C014C | R4C014D | R4C014E | R4014F |
| --- | --- | --- | --- | --- |
| Butyl 301 | 100 | 100 | 100 | 100 |
| Bromobutyl | 5 | — | 5 | — |
| Butadiene Rubber (BR900) | — | 5 | — | 5 |
| Paraffinic Oil | 13 | 13 | 13 | 13 |
| Silica 175 | 20 | 20 | 20 | 20 |
| Clay | 10 | 10 | 10 | 10 |
| Green color | 1 | — | 1 | — |
| Yellow Color | — | 1 | — | 1 |
| Trigonox 17-40B-gr | 12 | 6 | 24 | 14 |
| Total | 161 | 155 | 173 | 163 |

As can be seen, the present invention is an improvement over other tire puncture sealing technologies, such as U.S. Pat. No. 8,387,672 to Majumdar. The present invention, by contrast, does not use or require non-woven fiber layer as the "carrier" of the sealant. Instead, pure sealant layers are used without the need of a nonwoven carrier layer.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A tire with a built-in puncture sealant comprising:
   a supporting tire carcass having one or more layers of ply, an outer circumferential tread, and a radially inner layer,
   a pair of beads,
   sidewalls extending radially inward from the axial outer edges of a tread portion to join the respective beads,
   a sealant comprising an outer layer of sealant and an inner layer of sealant, disposed radially inwardly from said radially inner layer of said tire carcass,
   wherein the outer layer of sealant and the inner layer of sealant have different viscosities,
   wherein said sealant provides self-sealing properties to the tire,
   wherein said inner layer of sealant is in direct contact with said outer layer of sealant with no barrier separating said inner and outer layers of sealant, and
   wherein said outer layer of sealant and said inner layer of sealant are generated using a peroxide having a self-accelerated decomposition temperature (SADT) in the range 50-140° C.

2. The tire of claim 1 wherein said outer layer of sealant has a higher viscosity than said inner layer of sealant, and said inner layer of sealant has a lower viscosity than said outer layer of sealant.

3. The tire of claim 2, wherein the higher viscosity sealant has a G' at 35° C. in the range 0.5 MPa to 0.1 MPa and is generated from a precursor with peroxide.

4. The tire of claim 2, wherein the lower viscosity sealant has a G' at 35° C. in the range 0.3 MPa to 0.02 MPa and is generated from a precursor with peroxide.

5. The tire of claim 2, wherein the lower viscosity sealant is formed by thermal degradation of a precursor having a composition consisting predominantly of butyl rubber, the butyl rubber having a Mooney viscosity (ML(1+8) 125° C.) in the range 5-25 MU.

6. The tire of claim 2, wherein the the higher viscosity sealant is formed by thermal degradation of a precursor having a composition consisting predominantly of butyl rubber having a Mooney viscosity (ML(1+8) 125° C.) in the range 25-60 MU.

7. The tire of claim 1, further comprising an inner liner radially affixed to said tire carcass and an innermost sealant cover layer, wherein the outer layer of sealant and the inner layer of sealant are disposed between said inner liner and said sealant cover layer.

8. The tire of claim 7, further comprising a gas permeable layer disposed between said sealant and the sealant cover layer to cover any openings.

9. The tire of claim 7, wherein said cover layer has a 100% modulus of 0.5 MPa to 2.5 MPa.

10. The tire of claim 7, wherein said cover layer has a 100% modulus of 1.2 MPa to 1.9 MPa.

11. The tire of claim 10, wherein said higher viscosity sealant layer is directly formulated using elastomers selected from the group consisting of butadiene rubber, natural rubber, styrene-butadiene rubber, and blends thereof.

12. The tire of claim 1, wherein said sealant comprises degraded butyl rubber.

13. The tire of claim 1 wherein said sealant is split into two or more parallel circumferential bands.

14. The tire of claim 13 wherein said two or more parallel circumferential bands comprise four bands.

15. A method for making a tire comprising
   forming a green tire;
   adding a sealant precursor comprising an outer layer of sealant precursor and an inner layer of sealant precursor, wherein the outer layer of sealant precursor and the inner layer of sealant precursor each include a peroxide having a self-accelerated decomposition temperature (SADT) of 50° C.-140° C. and have different viscosities, curing said green tire;

wherein the outer layer of sealant precursor and the inner layer of sealant precursor are in direct contact with each other and degrade during cure to form sealant layers predominantly containing butyl rubber.

16. The method of claim 15, wherein the sealant precursor layers are made predominantly from butyl rubber having a Mooney viscosity (ML(1+8) 125° C.) in the range 30-60 MU.

\* \* \* \* \*